July 28, 1970

H. H. WIEDER 3,522,390

MAGNETORESISTIVE TRANSDUCER HAVING
MICROSCOPIC HALL FIELD SHORTING

Filed April 12, 1965

HARRY H. WIEDER
INVENTOR.

BY Nathan Cass

ATTORNEY

July 28, 1970  H. H. WIEDER  3,522,390
MAGNETORESISTIVE TRANSDUCER HAVING
MICROSCOPIC HALL FIELD SHORTING Filed April 12, 1965  3 Sheets-Sheet 2

HARRY H. WIEDER
INVENTOR.

BY Nathan Cass

ATTORNEY

United States Patent Office

3,522,390
Patented July 28, 1970

1

3,522,390
MAGNETORESISTIVE TRANSDUCER HAVING MICROSCOPIC HALL FIELD SHORTING
Harry H. Wieder, Riverside, Calif., assignor of twenty percent to Nathan Cass, Palos Verdes Peninsula, Calif.
Filed Apr. 12, 1965, Ser. No. 447,261
Int. Cl. H01c 7/16; H04r 23/00; H01l 15/00
U.S. Cl. 179—100.41                           12 Claims

ABSTRACT OF THE DISCLOSURE

A magnetoresistive transducer formed so as to provide a magnetoresistive thin film element for which Hall voltage shorting occurs on a microscopic level. The magnetoresistive thin film is mounted to a vibrating member for movement relative to a perpendicularly applied non-uniform magnetic field.

---

The present invention relates generally to transducing devices, and more particularly to transducing devices for translating acoustical or mechanical vibrations into electrical signals using the magnetoresistance effect.

Magnetoresistance is the name given to the change in resistance with applied magnetic field exhibited by certain materials. This magnetoresistance effect has long attracted the researcher for possible use in the fabrication of transducing devices. However, materials suitable for magnetoresistive transducer applications are limited. Also, besides the materials problem, the use of the magnetoresistance effect for transducer applications has been hampered by the relatively low magnetoresistance sensitivity and the lack of linearity exhibited by even the limited materials that are available.

One technique known in the art which has been found to increase the magnetoresistance effect is to provide a special transducer geometry which effectively short circuits the Hall field that appears in certain semiconductors when a magnetic field is perpendicularly applied to the direction of current flowing in a semiconductor, the Hall field occurring in a direction perpendicular to both the direction of current flow and the applied magnetic field. An example of a magnetoresistive transducer which utilizes a shorted Hall field geometry to increase magnetoresistance is the so-called Corbino disc which was invented over 45 years ago by O. M. Corbino. The Corbino disc comprises a thin annular disc having electrodes on the inner and outer bounding surfaces with a magnetic field applied perpendicularly to the plane of the disc.

A more recent attempt to increase magnetoresistance by employing a shorted Hall field geometry is disclosed in Pat. No. 3,109,985 which discloses an embodiment comprising an axially movable hollow cylinder of magnetoresistive material having annular electrodes provided at opposite ends of the cylinder with a magnetic field applied radially to the cylinder.

While the use of a shorted Hall field geometry for a magnetoresistive transducer does permit obtaining a significant increase in magnetoresistance, it introduces other disadvantages. For example, the special shorted Hall field geometry required usually makes it awkward and inconvenient to provide the necessary electrodes and magnetic field, as well as complicating the connection to the mechanical or acoustic source which is to be transduced. Also, a shorted Hall field geometry, even in the embodiment disclosed by Pat. No. 3,109,985, results in a relatively low effective resistance which makes detection of the change of resistance that much more difficult. Furthermore, the shorted Hall field geometry results in a relatively large mass for the transducer which severely limits frequency response.

In addition to the above, magnetoresistive transducers, generally, including those employing a shorted Hall field geometry, are known to have the further disadvantage that they essentially follow a square law magnetic field vs. displacement relationship, rather than a linear relationship. Consequently, if a linear relationship is required, the transducer must be limited to very small displacements to prevent distortion, which results in a significant reduction in the usable sensitivity.

Accordingly, it is the broad object of this invention to provide magnetoresistive transducer devices which to a great extent overcome the aforementioned disadvantages of prior art magnetoresistive transducers.

A more specific object of the invention is to provide a thin-film magnetoresistive transducer device which achieves the advantages of Hall field shorting without requiring a special geometrical configuration.

Another object of the invention is to provide a magnetoresistive transducer device in accordance with the foregoing objects which exhibits a highly linear response for translating acoustical or mechanical vibration into proportional electrical signals over a wide frequency range.

A further object of this invention is to provide, in accordance with one or more of the foregoing objects, magnetoresistive transducer devices having improved structural configurations.

Still another object of this invention is to provide a structural configuration for a magnetoresistive transducer which permits obtaining a linear response even when non-linear magnetoresistive elements are used.

Yet another object of this invention is to provide, in accordance with one or more of the foregoing objects, magnetoresistive phonograph pick-up devices for both monaural and stereo having a relatively high output, a wide frequency range and significant advantages over presently known phonographic pick-up devices.

An additional object of the invention is to provide a structural configuration for a magnetoresistive transducer which significantly increases both the sensitivity and linearity of the transducing operation.

Briefly, the above objects are achieved in accordance with a typical embodiment of the invention by employing a transducer device including a composite thin film magnetoresistive semiconductor element disposed perpendicularly to an applied magnetic field having a linear gradient, the element being mounted for movement with respect to the gradient so as to have a linearly varying magnetic field applied thereto in response to the mechanical vibration which is to be transduced. Spaced electrodes are connected to appropriate portions of the thin film magnetoresistive element to permit current flow in the plane of the film for the purpose of detecting resistance changes in the thin film element which occur in response to movement of the element in the applied linear gradient magnetic field. The composite semiconductor film element is formed so that Hall field shorting occurs on a microscopic level in the thin film, whereby the magnetoresistive advantages of Hall field shorting are realized in a thin film structure without requiring a special Hall field shorting geometry. Also, it has been discovered that such microscopic Hall field shorting in a composite thin film permits achieving, in the resultant transducer device, the additional and unexpected advantage of providing a large extended linear range for linear translation of mechanical vibrations into proportional electrical signals, as is highly desirable, for example, in phonograph pick-up devices.

The specific nature of the invention as well as other objects, advantages and uses thereof will become apparent by reference to the followed detailed description when considered in conjunction with the accompanying drawings in which.

Like numerals designate like elements throughout the figures of the drawings. Also, for purposes of illustration the thicknesses of various layers and/or films are shown exaggerated in the drawings.

Figure 1:
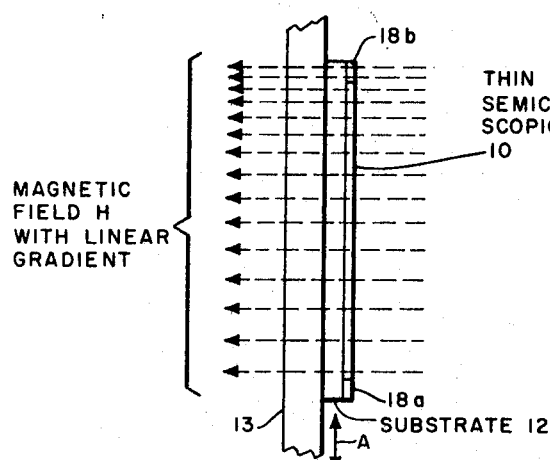
FIG. 1 illustrates basic portions of a magnetoresistive transducer device in accordance with the invention.
Figure 2:
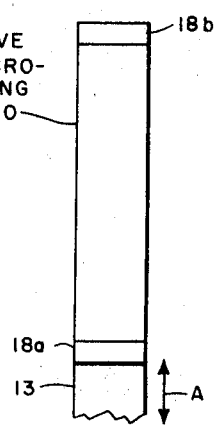
FIG. 2 is a right side view of FIG. 1.

Referring to FIGS. 1 and 2, illustrated therein, are basic portions of a magnetoresistive transducer device in accordance with the invention. The portions illustrated comprise a vibrating mechanical member 13 moving in the lineal direction indicated by the arrow A, a non-conductive substrate 12 rigidly affixed to the moving member 13, and a microscopically Hall field shorted film magnetoresistive semiconductor 10 having a linear magnetoresistance characteristic formed on the substrate 12 with spaced electrodes 18a and 18b also provided at opposite ends of the film 10.

As schematically illustrated in FIG. 1, the magnetoresistive film 10 is disposed in a perpendicular linear gradiant magnetic filed H provided in any suitable manner. As a result, movement of the magnetoresistive thin film 10 is unison with the mechanical member 13 causes a varying magnetic field to be applied to the thin film 10. The magnitude of the resistance appearing across electrodes 18a and 18b will thus vary proportionately to the movement of mechanical member 18 and, by appropriate connection of these electrodes to suitable electronic circuitry, this resistance change can be converted into a proportional voltage change for utilization in any desired manner.

One of the most important features of this invention resides in the provision in the transducer of a thin film magnetoresistive element having microscopic Hall field shorting. I have discovered that such an element provides an unexpectedly large linear range of operation. The manner in which such a thin film element having microscopic Hall field shorting can be fabricated from indium and antimony in accordance with the invention will now be explained.

First, indium (In) and antimony (Sb) from either separate sources or a comon source, are vapor deposited onto a glass substrate—for example, in the manner described by K. G. Guenther, Z. Naturforsch. 13a, 1081 (1958)—to form a stoichiometric, polycrystalline InSb thin film of $10^{-4}$ to $2 \times 10^{-4}$ centimeter, but preferably less than $5 \times 10^{-4}$ cm. Instead of using a glass substrate, a substrate approximately $10^3$ A. thick of $Al_2O_3$ backed by a thin sheet of aluminum or of titanium dioxide $10^3$ A. to $5 \times 10^3$ A. in thickness backed by titanium may also be employed. Such InSb films have a relatively high resistivity, low electron mobility, high concentration of impurities and in consequence of all these factors, a negligible magnetoresistance.

Next, a thin layer of pure In, 2% to 10% by weight of the deposited InSb, is vapor deposited on the surface of said InSb film. The resultant composite film is then heated in a vacuum chamber up to its melting point. Care should be exercised that the surface tension of the liquid film does not overcome the planar stress binding it to its substrate. This may be accomplished by precise temperature control as well as control of the rate of change of temperature. After melting of the composite film, the temperature is reduced by shutting off the source of radiant heat used to induce the melting process, thereby allowing the film to return to room temperature in a time of 2 to 5 minutes. The solidification thus brought about causes a specific and preferential recrystallization of the film. The recrystallization process causes the segregation of the In from the InSb such that the InSb forms large single crystals joined into dendrites with the In freezing at the periphery of these dendrites, whereby the Hall potential is shorted within the dendrites, essentially on a microscopic level. Electrodes of arbitrary shape are applied to the film thereafter. They may consist of evaporated gold, painted-on silver or similar high conductivity elements. In the simplest configuration, such electrodes are fabricated as two parallel stripes on the opposite boundaries of a film specimen and wires are applied thereto in order to connect the film to auxiliary electronic circuitry.

Figure 3:
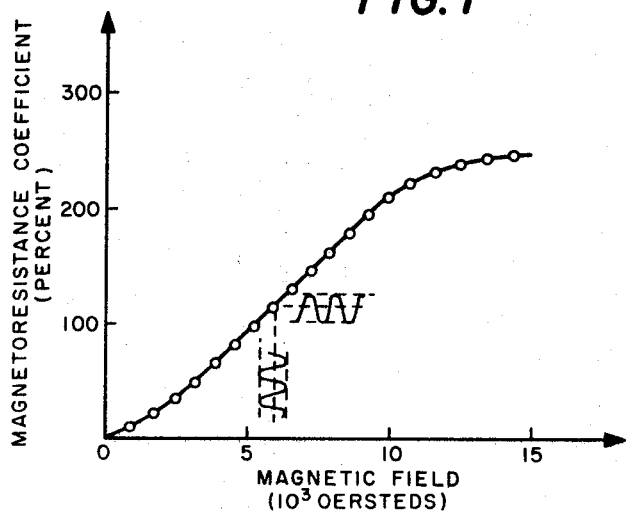
FIG. 3 is a graph illustrating the variation of the magnetoresistance coefficient of an InSb-In semiconductor thin film with variations in a perpendicularly applied magnetic field.

The resulting recrystallized InSb+In two-phase alloy film exhibits a significant magnetoresistance of geometrical origin which is isotropic in the plane of the film. While the value of the magnetoresistance coefficient of the InSb+In film is smaller than for other magnetoresistance devices using, for example, the Corbino disc or other Hall field shorting, I have discovered that the microscopic Hall field shorting of the dendrites of the recrystallized InSb+In films unexpectedly provide the most important advantage of exhibiting an extended linear range of the variation of resistance with applied magnetic field as illustrated by the graph of FIG. 3.

Figure 4:
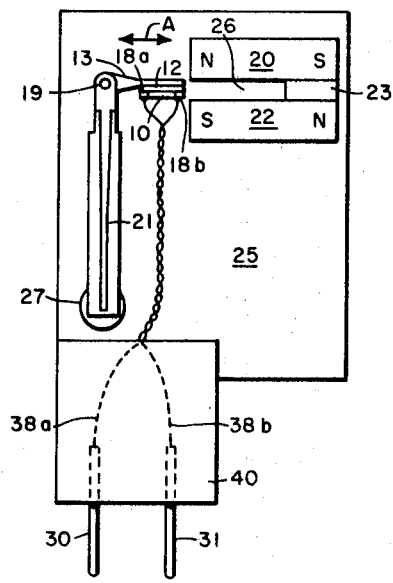
FIG. 4 illustrates a phonograph pick-up device in accordance with the invention.

FIG. 4 illustrates how a Hall field shorted InSb+In thin film 10, may advantageously be incorporated into a phonograph pick-up device in accordance with the invention. Referring to FIG. 4, two parallel, permanent bar magnets 20 and 22 are magnetically coupled by a soft iron member 23 and are spaced so as to form a narrow gap 26 in which the magnetic field strength is preferably at least 2000 oersteds maximum between the poles. The resulting magnet structure 20, 22 and 23 is suitably affixed to a supporting base 25.

Figure 5:
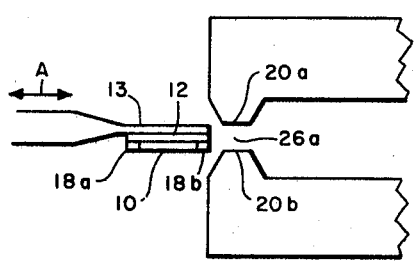
FIG. 5 is an enlarged fragmentary view of a portion of FIG. 4 illustrating a modified magnetic pole shape.

An InSb+In film 10, of the order of $10^{-4}$ to $2 \times 10^{-4}$ cm. thick, is vapor deposited and recrystallized on a substrate 12 in the manner previously described with spaced electrodes 18a and 18b being provided at the ends of the film, as shown in FIGS. 4 and 5. The substrate 12 and its magnetoresistive film 10 is rigidly attached to a Phosphor bronze member 13 which is in turn rigidly attached to a conventional phonograph stylus and vibrating bar arrangement designated in FIG. 4 by numerals 19 and 21, respectively. The stylus and vibrating bar 19 and 21 are suitably mounted to the supporting member 25 by soldering the end furthest from the stylus 19 to a metal projection 27 affixed to the supporting member 25.

It will be understood that as the stylus 19 follows the grooves of a conventional record, it will move substantially in the direction of the arrow A in FIGS. 4 and 5, causing the magnetoresistive film 10 to move in and out of the gap 26 in accordance with the signal to be reproduced. To a first approximation, the magnetic field gradient presented to the moving magnetoresistive film 10 by the magnetic bars 20 and 22 is essentially linear, but if a more linear gradient is desired, shaped pole pieces such as shown at 20a and 20b in FIG. 5 may be employed. Respective leads 38a and 38b are suitably soldered to the electrodes 18a and 18b of the magnetoresistive film 10, and, as illustrated in FIG. 4, are brought out to conventional plug terminals 30 and 31 of an electrical plug 40 affixed to supporting member 25. The plug 40 is adapted to be fitted into a suitable phonograph arm (not shown) having suitable connections mating with terminals 30 and 31 so as to connect the magnetoresistive film 10 into an electric circuit, such as illustrated schematically in FIGS. 6 and 7. The resulting system then serves the purpose of transforming the variations in resistance of the magnetoresistive film 10 into variations in acoustic pressure, i.e. sound produced by a loudspeaker 75.

Figure 6:
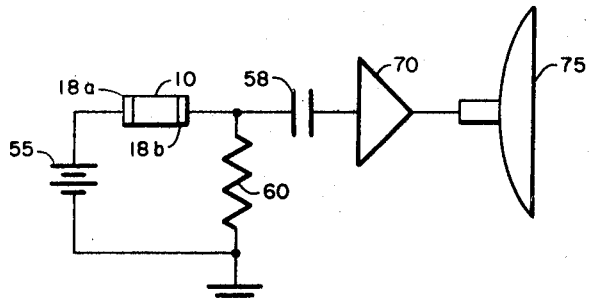
FIGS. 6 and 7 are circuit diagrams illustrating two exemplary circuits for converting the varying resistance output of the phonograph pick-up device of FIGS. 4 and 5 into an appropriate electrical signal for feeding to a loudspeaker.
Figure 7:
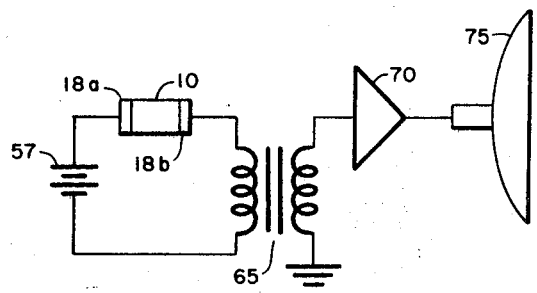

In the circuit of FIG. 6, the magnetoresistive film 10 is connected in series with a battery 55 and a bias resistor 60 and A-C coupled to a conventional power amplifier 70 and loudspeaker 75 by way of a coupling capacitor 58. In the circuit of FIG. 7, transformer coupling is employed, the magnetoresistive film 10 being connected in series with a battery 57 and the primary winding of a transformer 65. The secondary winding of the transformer 65 is coupled to a conventional power amplifier 70 which feed the loudspeaker 75.

Typically, the vapor deposited and recrystallized InSb+In thin film 10 used in the embodiments of FIGS. 4–7, may have a resistance between electrodes 18a and 18b of 50 ohms and the bias current therethrough may be adjusted to 5 milliamperes. Such a magnetoresistive film 10 has been found to provide an output voltage in excess of 5 millivolts peak-to-peak with a substantially flat frequency response throughout the audio range.

Figure 8:
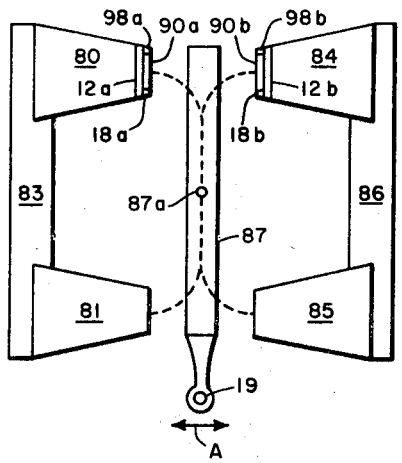
FIG. 8 illustrates the construction of another embodiment of a phonograph pick-up device which permits obtaining a linear response irrespective of any non-linearity in magnetoresistive elements employed therein.

The construction and operation of another embodiment of a phonograph pickup device in accordance with the invention, is illustrated in FIG. 8. Its advantage is that a linear-high fidelity response may be obtained even from non-linear magnetoresistive elements, i.e. magnetoresistive films or devices which have a substantially non-linear variation in resistance with magnetic field. A first pair of tapered permanent magnets 80 and 81 connected by a soft iron yoke 83, are oppositely disposed from a second pair of tapered permanent magnets 84 and 85 connected by a soft iron yoke 86. An armature 87 comprised of a thin plate of a high permeability low residual magnetization alloy, such as $\mu$-metal, is pivoted at its center 87a for displacement in the horizontal plane in accordance with a stylus 19 to which the armature 87 is rigidly attached. The stylus 19 moves in the grooves of a record (not shown) substantially in the direction indicated in FIG. 8 by the arrow A.

Figure 9:
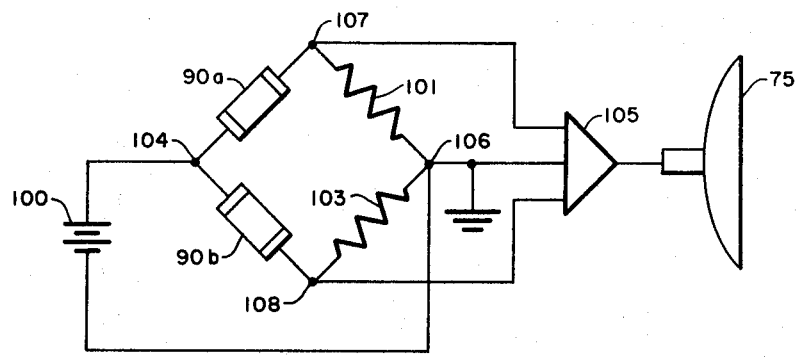
FIG. 9 is a circuit diagram illustrating how the pick-up device of FIG. 8 may be incorporated in an electrical circuit.

Two oppositely disposed magnetoresistive elements 90a and 90b are provided in the embodiment of FIG. 8 and affixed to pole faces of the oppositely disposed upper magnets 80 and 84 with electrodes 98a and 98b being provided at the ends thereof to permit connection in the bridge circuit of FIG. 9. As shown in FIG. 9, the magnetoresistive elements 90a and 90b are connected in adjacent branches to form a bridge circuit along with resistors 101 and 103. A D-C source 100 is connected between the junction 104 of the magnetoresistive elements 90a and 90b and the junction 106 between resistors 101 and 103, and also provides an initial bias for the magnetoresistive elements 90a and 90b. The bridge output appears across junctions 107 and 108 and is applied to a balanced differential amplifier 105 whose output is in turn applied to loudspeaker 75 after suitable amplification by a power amplifier 105.

The operation of the phonograph pick-up device of FIG. 8 in the circuit of FIG. 9 will now be considered in detail. It can be shown mathematically that the magneto-resistance coefficients $(\Delta r/r_0)$ for each of the magnetoresistive elements in the embodiment of FIG. 8 can be represented by the equation $(\Delta r/r_0) \cong k(B_m + c/l_0)^2$ where $B_m$ is the magnetic induction on the magnetic pole faces, $l_0$ is the flux air-path and $k$ and $c$ are both constant parameters. A displacement of the armature 87 towards magnet 80 in FIG. 8 increases the induction on the magnetoresistive film 10a, while descreasing the induction on magnetoresistive film 10b, and vice versa, for a displacement of armature 87 toward magnet 84. If $l/2$ is considered to denote the change in gap length near each pole face, and if it is assumed that the armature 87 is displaced towards magnet 80, then the magnetoresistance coefficient $(\Delta r/r_0)'$ for the magnetoresistive film 90a may be expressed as $(\Delta r/r_0)' = k(B_m - c/l)^2$, and the magnetoresistive coefficient $(\Delta r/r_0)''$ for the magnetoresistive film 90b may be expressed as $(\Delta r/r_0)'' = k(B_m - c/l)^2$. In view of the above equations, the differential response of the armature displacement of FIG. 8 is then $$(\Delta r/r)' - (\Delta r/r)'' = 4kc/l$$

which causes the bridge output applied to amplifier 105 to be a linear function of the reluctance modulation of the air gap. Hence, the output voltage applied to loudspeaker 75 will be a faithful replica of the motion of stylus 19 irrespective of any nonlinearity in the magnetic field dependence of the magnetoresistance of the individual films. The embodiment of FIG. 8 is particularly advantageous for use with non-linear magnetoresistive elements. When used with linear magnetoresistive elements, such as the InSb+In films formed as previously described, an extremely linear relationship is achieved permitting a significantly greater armature displacement and thus a much higher sensitivity.

Figure 10:
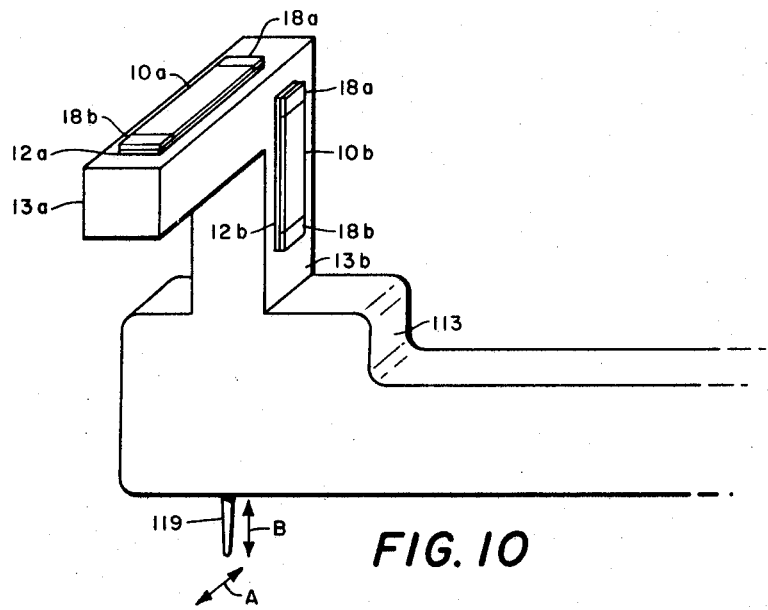
FIG. 10 is a pictorial view illustrating the magnetoresistive film portion of a stereo phonograph pick-up device in accordance with the invention.
Figure 11:
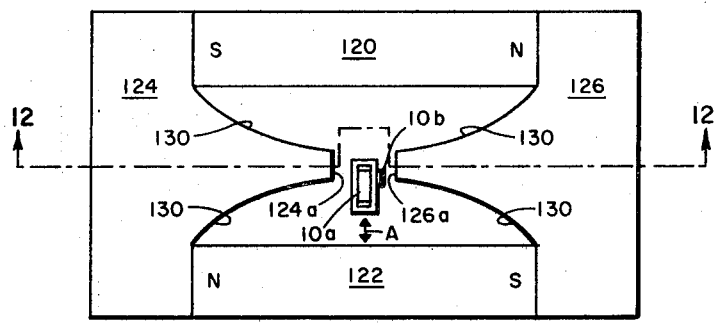
FIGS. 11 and 12 are top and front views of a preferred magnet construction for a stereo phonograph pick-up device incorporating the magnetoresistive film portion of FIG. 10, the view of FIG. 12 being a cross section taken along the line 12—12 in FIG. 11.
Figure 12:
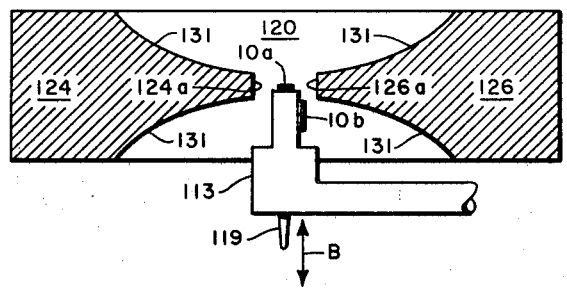

The construction and arrangement of a stereo phonograph pick-up device is illustrated in FIGS. 10–12. FIG. 10 shows the magnetoresistive film portion employing two perpendicularly disposed InSb+In films 10a and 10b, and FIGS. 11 and 12 illustrate how the transducer portion of FIG. 10 may be incorporated into a magnet structure which applies a linear gradient magnetic field to each of films 10a and 10b as they move in accordance with a conventional stylus 119.

Referring first to FIG. 10, the InSb+In films 10a and 10b formed on respective substrates 12a and 12b are rigidly affixed to perpendicular supporting members 13a and 13b so that the planes of the films 10a and 10b are at right angles to one another. The InSb+In films 10a and 10b are formed on their respective substrates 12a and 12b as previously described with respective electrodes 18a and 18b being provided to permit connection of each of the films 10a and 10b to an appropriate electrical circuit as illustrated, for example, in FIGS. 6 and 7.

The supporting member 13b in FIG. 10 depends from a larger member 113 having a conventional stylus 119 which, in following the grooves of a stereo record, moves in the directions indicated by arrows A and B. For proper operation of the stereo transducer shown partly in FIG. 10, an appropriately directed magnetic field having a linear gradient in each of two dimensions has to be provided.

A preferred magnet construction for producing these magnetic fields is illustrated in FIGS. 11 and 12. As shown in FIGS. 11 and 12, two permanent magnets 120 and 122 are coupled by soft iron pole pieces 124 and 126 shaped so as to form opposing pole faces 124a and 126a between which the magnetoresistive film portion of FIG. 10 is disposed for movement in the direction indicated by arrows A and B. The curve shapes 130 and 131 of the pole pieces 124 and 126 are preferably hyperbolic so as to provide greater linearity of the magnetic field gradient for movement of the films 10a and 10b in the directions A and B.

It will be understood by reference to FIGS. 11 and 12 along with FIG. 10 that, as each of the magnetoresistive films 10a and 10b moves in its respective direction A or B is response to movement of the stylus 119, each will be subjected to a linear magnetic field gradient which will cause a corresponding proportional change in the resistance of the film. It will also be understood that, because the planes of films 10a and 10b are at right angles to each other, and because each of the magnetic fields remains substantially constant for movement of a film parallel thereto, each film will respond only to displacement of the stylus 119 in a respective one of the directions A or B. Thus, film 10a in FIGS. 10–12 will respond only to displacement of the stylus 119 in the direction A, while film 10b will respond only to displacement in the direction B. By connecting each of the films 10a and 10b in a respective electrical circuit, such as illustrated in FIGS. 6 and 7, a two channel stereo output is then conveniently provided.

It is to be understood that the specific embodiments disclosed herein are only exemplary and that various modifications in construction and arrangement are possible without departing from the scope of this invention. The present invention, therefore, is to be considered as including all possible modifications and variation coming within the scope of the invention as defined in the appended claims.

What is claimed is:

1. A magnetoresistive transducer comprising: a vibrating member, a substrate rigidly mounted for movement with said vibrating member, a vapor deposited and recrystallized InSb+In thin film formed on said substrate such that the InSb is in the form of single crystals joined into dendrites with the In being frozen at the periphery of these dendrites means for applying a magnetic field to said magnetoresistive film substantially perpendicular to the plane thereof, and electrodes provided on said film to permit connection thereof in an electrical circuit.

2. A magnetoresistive transducer comprising: a vibrating member, a non-conductive substrate rigidly mounted for movement with said vibrating member, a vapor deposited and recrystallized InSb+In thin film of less than 5 microns formed on said substrate such that the InSb is in the form of single crystals joined into dendrities with the In being frozen at the periphery of these dendrites, means for applying a substantially linear gradient magnetic field to said magnetoresistive film, said magnetic field being arranged with respect to said magnetoresistive film and at least one direction of movement of said vibrating member so as to produce proportional changes in the resistance of said film in response to the movement of said vibrating member in said one direction, and spaced electrodes provided in cooperation with said magnetoresistive film to permit an electrical current to be applied thereto.

3. In a phonograph pick-up device comprising a stylus constructed and arranged for movement in the grooves of a phonograph record, the improvement comprising: a nonconductive substrate rigidly mounted for movement with said stylus, a vapor deposited and recrystallized InSb+In thin film formed on said substrate such that the InSb is in the form of single crystals joined into dendrites with the In being frozen at the periphery of these dendrites, means for applying a magnetic field to said magnetoresistive film perpendicular to the plane thereof and varying in magnitude in at least one direction of movement of said stylus, and spaced electrodes affixed to said film.

4. The invention in accordance with claim 3 wherein the means for applying a magnetic field includes a pair of spaced, tapered pole pieces located so as to present a substantially linear gradient magnetic field to said film.

5. A magnetoresistive transducer comprising: a vibrating member vibrating in a plurality of directions, a plurality of magnetoresistive thin films rigidly mounted for movement with said vibrating member with the planes thereof at angles corresponding to said plurality of directions, each magnetoresistive film being a vapor deposited and recrystallized InSb+In thin film formed such that the InSb is in the form of single crystals joined into dendrites with the In being frozen at the periphery of these dendrites, means for applying magnetic fields to said film, said magnetic fields being arranged with respect to said magnetoresistive films and the directions of movement of said vibrating member so that said magnetoresistive films exhibit changes in resistance representing the movement of said vibrating member in said plurality of directions, and electrodes affixed to each magnetoresistive film to permit sensing the change in resistance of each respective film.

6. The invention in accordance with claim 5, wherein said plurality of directions comprises two mutually perpendicular directions, and wherein said plurality of magnetoresistive films comprises two magnetoresistive films having their planes at right angles to one another.

7. In a stereo phonograph pick-up device comprising a stylus constructed and arranged for movement in the grooves of a stereo phonograph record, the improvement comprising: first and second magnetoresistive thin films rigidly mounted for movement with said stylus, each magnetoresistive film being a vapor deposited and recrystallized InSb+In thin film formed such that InSb is in the form of single crystals joined into dendrites with the In being frozen at the periphery of these dendrites, means for applying a magnetic field to said magnetoresistive films, said magnetoresistive films being located with respect to said magnetic field and the directions of movement of said stylus so that one of said magnetoresistive films exhibits proportional resistance changes in response to one stereo channel and the other of said magnetoresistive films exhibits proportional resistance changes in response to the other stereo channel, and electrodes cooperating with said films to permit sensing of their resistance variations.

8. In a stereo phonograph pick-up device comprising a stylus constructed and arranged for movement in the grooves of a stereo phonograph record, the improvement comprising: first and second magnetoresistive thin films of less than 5 microns rigidly mounted for movement with said stylus and disposed with their planes at right angles to one another and with the respective plane of each parallel to the respective direction of movement of said stylus to which each is to be responsive, each magnetoresistive film being a vapor deposited and recrystallized InSb+In thin film formed such that the InSb is in the form of single crystals joined into dendrites with the In being frozen at the periphery of these dendrites, means for applying a magnetic field perpendicularly to the plane of each film and varying in the direction of movement thereof to which each is responsive, and means provided on each film to permit connection thereof in an electrical circuit.

9. The invention in accordance with claim 8, wherein the means for applying a magnetic field perpendicularly to the plane of each film includes a magnet structure having a pair of oppositely disposed conically tapered pole pieces.

10. The invention in accordance with claim 9, wherein the tapering of said pole pieces is approximately hyperbolic.

11. A magnetoresistive transducer comprising: a pair of spaced oppositely disposed magnetic pole pieces, a magnetoresistive element affixed to the face of each pole piece, a magnetically permeable armature disposed for movement between said pole pieces so as to increase the magnetic induction on one magnetoresistive element while decreasing the magnetic induction on the other, and means provided on each element to permit connection in an electrical circuit, each magnetoresistive element comprising a nonconductive substrate having a vapor deposited and recrystallized InSb+In thin film formed thereon such that the InSb is in the form of single crystals joined into dendrites with the In being frozen at the periphery of these dendrites.

12. A magnetoresistive transducing system comprising: a vibrating member, a substrate rigidly mounted for movement with said vibrating member, a vapor deposited and recrystallized InSb+In thin film formed on said substrate such that the InSb is in the form of single crystals joined into dendrites with the In being frozen at the periphery of these dendrites, means for applying a magnetic field to said magnetoresistive film so as to produce a corresponding change in the resistance thereof in accordance with the vibration of said vibrating member, means for applying a current bias to said film, and means for sensing and amplifying variations in the resistance of said film.

References Cited

UNITED STATES PATENTS

| | | | |
|---|---|---|---|
| 2,866,857 | 12/1958 | Andrews | 179—100.41 |
| 2,914,728 | 11/1959 | Brophy et al. | 324—45 |
| 3,046,361 | 7/1962 | Wiehl | 179—100.41 |
| 3,061,771 | 10/1962 | Planer et al. | 179—100.41 X |
| 3,109,985 | 11/1963 | Kallmann | 323—94 |
| 3,260,980 | 7/1966 | Weiss | 179—100.2 X |
| 3,321,384 | 5/1967 | Wieder et al. | 204—38 |
| 3,341,364 | 9/1967 | Collins | 117—227 |

FOREIGN PATENTS

| | | |
|---|---|---|
| 872,886 | 7/1961 | Great Britain. |

BERNARD KONICK, Primary Examiner

R. F. CARDILLO, Jr., Assistant Examiner

U.S. Cl. X.R.

317—235; 338—32